US009973434B2

(12) United States Patent
Wakabayashi et al.

(10) Patent No.: US 9,973,434 B2
(45) Date of Patent: May 15, 2018

(54) COMMUNICATIONS TERMINAL AND METHOD

(71) Applicant: SONY CORPORATION, Tokyo (JP)

(72) Inventors: Hideji Wakabayashi, Basingstoke (GB); Matthew William Webb, Basingstoke (GB)

(73) Assignee: SONY CORPORATION, Tokyo (JP)

(*) Notice: Subject to any disclaimer, the term of this patent is extended or adjusted under 35 U.S.C. 154(b) by 61 days.

(21) Appl. No.: 14/904,484

(22) PCT Filed: Jul. 2, 2014

(86) PCT No.: PCT/GB2014/052000
§ 371 (c)(1),
(2) Date: Jan. 12, 2016

(87) PCT Pub. No.: WO2015/019042
PCT Pub. Date: Feb. 12, 2015

(65) Prior Publication Data
US 2016/0205025 A1    Jul. 14, 2016

(30) Foreign Application Priority Data

Aug. 6, 2013   (EP) .................................. 13179483

(51) Int. Cl.
*H04L 12/851*   (2013.01)
*H04L 12/801*   (2013.01)
(Continued)

(52) U.S. Cl.
CPC .......... *H04L 47/24* (2013.01); *H04L 47/2416* (2013.01); *H04L 47/29* (2013.01);
(Continued)

(58) Field of Classification Search
CPC ..... H04L 47/2416; H04L 47/30; H04L 47/24; H04L 47/741; H04L 47/29; H04W 36/023;
(Continued)

(56) References Cited

U.S. PATENT DOCUMENTS

2004/0223505 A1   11/2004   Kim et al.
2006/0062171 A1   3/2006    Baiamonte et al.
(Continued)

FOREIGN PATENT DOCUMENTS

EP   1 475 985 A2   11/2004
EP   1 475 985 A3   11/2004
(Continued)

OTHER PUBLICATIONS

"LTE; Evolved Universal Terrestrial Radio Access (E-UTRA); Physical channels and modulation (3GPP TS 36.211 version 11.3.0 Release 11)" ETSI TS 136 211 V11.3.0, Jul. 2013, pp. 1-109.
(Continued)

*Primary Examiner* — Maharishi V Khirodhar
*Assistant Examiner* — Kenneth P Hunt
(74) *Attorney, Agent, or Firm* — Oblon, McClelland, Maier & Neustadt, L.L.P.

(57)    ABSTRACT

A communications terminal includes a transmitter to transmit signals, a receiver to receive signals, and a controller to control the transmitter and receiver. The controller includes an input buffer receiving data packets for transmission. The controller can identify whether the received data packets are delay tolerant or non-delay tolerant, to determine a current state for communications for transmitting the data packets and based on predetermined conditions including a current state for radio communications, an amount of the delay tolerant data packets in the input buffer, and an amount of the non-delay tolerant packets in the input buffer, either transmit
(Continued)

multi-level coverage conditions the non-delay tolerant data packets or transmit the non-delay tolerant data packets and the delay tolerant data packets from the input buffer to a mobile communications network using the transmitter, or maintain the delay tolerant or non-delay tolerant data packets in the input buffer until the predetermined conditions are satisfied.

15 Claims, 13 Drawing Sheets

(51) Int. Cl.
    *H04L 12/835*     (2013.01)
    *H04L 12/911*     (2013.01)
    *H04W 36/02*     (2009.01)
    *H04W 52/02*     (2009.01)
    *H04L 12/853*     (2013.01)
    *H04W 28/02*     (2009.01)

(52) U.S. Cl.
    CPC ............ *H04L 47/30* (2013.01); *H04L 47/741* (2013.01); *H04W 28/0231* (2013.01); *H04W 36/023* (2013.01); *H04W 52/0222* (2013.01); *Y02D 70/00* (2018.01); *Y02D 70/1242* (2018.01); *Y02D 70/1262* (2018.01); *Y02D 70/21* (2018.01); *Y02D 70/23* (2018.01)

(58) Field of Classification Search
    CPC . H04W 52/0222; H04W 28/10; H04W 28/14; H04W 72/1226; H04W 72/1242; H04W 72/1252
    USPC ...................... 370/235–238.1; 455/452.1–455
    See application file for complete search history.

(56) References Cited

U.S. PATENT DOCUMENTS

| | | | | |
|---|---|---|---|---|
| 2007/0002750 | A1* | 1/2007 | Sang | H04W 72/1236 370/238 |
| 2008/0225794 | A1* | 9/2008 | Dore | H04W 36/26 370/331 |
| 2013/0148624 | A1 | 6/2013 | Gil et al. | |
| 2014/0004888 | A1* | 1/2014 | Ando | H04W 24/08 455/456.6 |
| 2015/0282083 | A1* | 10/2015 | Jeong | H04W 52/0216 370/311 |
| 2016/0157268 | A1* | 6/2016 | Wakabayashi | H04W 24/10 370/329 |

FOREIGN PATENT DOCUMENTS

| | | |
|---|---|---|
| GB | 2487757 A | 8/2012 |
| GB | 2487780 A | 8/2012 |
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| WO | WO 2004/047379 A2 | 6/2004 |
| WO | WO 2004/047379 A3 | 6/2004 |

OTHER PUBLICATIONS

"LTE; Evolved Universal Terrestrial Radio Access (E-UTRA); Multiplexing and channel coding (3GPP TS 36.212 version 11.3.0 Release 11)" ETSI TS 136 212 V11.3.0, Jul. 2013, pp. 1-85.

"LTE; Evolved Universal Terrestrial Radio Access (E-UTRA); Physical layer procedures (3GPP TS 36.213 version 11.3.0 Release 11)" ETSI TS 136 213 V11.3.0, Jul. 2013, pp. 1-177.

"LTE; Evolved Universal Terrestrial Radio Access (E-UTRA); Radio Resource Control (RRC); Protocol specification (3GPP TS 36.331 version 11.4.0 Release 11)" ETSI TS 136 331 V11.4.0, Jul. 2013, pp. 1-349.

"$3^{rd}$ Generation Partnership Project; Technical Specification Group Services and System Aspects; Machine-Type and other Mobile Data Applications Communications Enhancements (Release 12)" 3GPP TR 23.887 V0.8.0, Feb. 2013, pp. 1-107.

"LTE; Evolved Universal Terrestrial Radio Access (E-UTRA) and Evolved Universal Terrestrial Radio Access Network (E-UTRAN); Overall description; Stage 2 (3GPP TS 36.300 version 10.7.0 Release 10)" ETSI TS 136 300 V10.7.0, Mar. 2012, pp. 1-203.

"LTE; Evolved Universal Terrestrial Radio Access (E-UTRA); Medium Access Control (MAC) protocol specification (3GPP TS 36.321 version 10.5.0 Release 10)" ETSI TS 136 321 V10.5.0, Mar. 2012, pp. 1-55.

"LTE; Evolved Universal Terrestrial Radio Access (E-UTRA); Requirements for support of radio resource management (3GPP TS 36.133 version 10.6.0 Release 10)" ETSI TS 136 133 V10.6.0, Apr. 2012, pp. 1-568.

U.S. Appl. No. 14/904,921, filed Jan. 13, 2016, Wakabayashi, et al.

* cited by examiner

DM-RS for PUSCH transmission timing within one slot in case of (a) normal cyclic prefix and (b) extended cyclic prefix operation Mapping of PUCCH formats to PUCCH regions m multi-level coverage conditions

COMMUNICATIONS TERMINAL AND METHOD

CROSS-REFERENCE TO RELATED APPLICATIONS

The present application is based on PCT filing PCT/GB2014/052000 filed Jul. 2, 2014, and claims priority to European Patent Application 13 179 483.6, filed in the European Patent Office on Aug. 6, 2013, the entire contents of each of which being incorporated herein by reference.

TECHNICAL FIELD OF THE DISCLOSURE

The present disclosure relates to communications terminals and methods for communicating and wireless communications networks and methods of communicating via wireless communications networks.

BACKGROUND OF THE DISCLOSURE

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include medical devices which are continuously or intermittently transmitting data such as for example measurements or readings from monitors via a communications network to a server, and automotive applications in which measurement data is gathered from sensors on a vehicle and transmitted via a mobile communications network to a server attached to the network.

Whilst it can be convenient for a terminal such as an MTC type terminal to take advantage of the wide coverage area provided by a third or fourth generation mobile telecommunication network there are at present disadvantages. Unlike a conventional third or fourth generation mobile terminal such as a smartphone, an MTC-type terminal is preferably relatively simple and inexpensive. The type of functions performed by the MTC-type terminal (e.g. collecting and reporting back data) do not require particularly complex processing to be performed. Furthermore these more simplified devices may be battery operated and may be required to be deployed for a significant amount of time before the batteries are replaced. Therefore power conservation is an important consideration. Furthermore it is always important to utilise the resources of a mobile communications network as efficiently as possible. However efficient use of communications resources and conservation of power are applicable aims generally to all types of communications terminals.

SUMMARY OF THE DISCLOSURE

According to an example embodiment of the present disclosure there is provided a communications terminal comprising a transmitter configured to transmit signals to a wireless communications network via a wireless access interface provided by the wireless communications network. The communications terminal also comprises a receiver configured to receive signals from the wireless communications network, and a controller configured to control the transmitter and the receiver to transmit and receive the signals, wherein the controller includes an input buffer for receiving data packets for transmission as the signals via the wireless access interface. The controller is configured to identify whether the received data packets are delay tolerant or non-delay tolerant, to determine in combination with signals received from the receiver an indication of a current state for radio communications formed by the wireless access interface for transmitting the data packets via the wireless access interface, and in accordance with the predetermined conditions which include a current state for radio communications and an amount of the delay tolerant data packets in the input buffer and an amount of the non-delay tolerant packets in the input buffer either to transmit the non-delay tolerant data packets or to transmit the non-delay tolerant data packets and the delay tolerant data packets from the input buffer to the mobile communications network using the transmitter, or maintaining the delay tolerant or non-delay tolerant data packets in the input buffer until the predetermined conditions are satisfied.

Embodiments of the present technique can provide an arrangement in which data packets which can be classified into at least delay tolerant and non-delay tolerant data packets are transmitted by a communications terminal in a way which can conserve the power of the communications terminal and more efficiently utilise the communications resources of a wireless access interface provided by a mobile communications network. As will be appreciated delay tolerant data packets can be delayed for a predetermined time or indefinitely and so therefore buffered in an input buffer before being transmitted. Depending on currently experienced radio conditions for transmitting the data packets a communications terminal can buffer the input packets data packets for delay tolerant data packets until the channel is in a state in which communications resources can be used efficiently to transmit the data packets. Furthermore, signalling and control data is required to be transmitted from both the communications terminal and the mobile communications network before a communications terminal can access communications resources for transmitting the data packets. Therefore the more data packets which can be transmitted in any connection session, such as when a communications terminal has established a bearer via the wireless access interface the more efficient the transmission of the data packets. Thus by queuing the data packets in an input buffer until a predetermined number of the delay tolerant data packets are received, a more efficient use of radio communications resources can be achieved. However communications terminals also need to transmit the non-delay tolerant data packets. If one or more of the non-delay tolerant data packets are present in the input buffer then depending on the state of the radio communications channel, the communications terminal can transmit the non-delay tolerant data packets with the delay tolerant data packets in order to achieve both an efficiency gain in the use of the radio communications resources and conserving an amount of power available to the mobile communications terminal. The power conservation is achieved in one example by only transmitting the data packets when the state for radio communications exceeds a predetermined quality metric. Thus the communications terminal only transmits data packets as a function of the state of the radio communications channel and the number of delay tolerant and non-delay tolerant data packets present in an input buffer. Accordingly, with this combination of features, a communications terminal is both able to conserve power and utilise resources of the communications wireless access interface more efficiently.

In one example embodiment the transmission of the delay tolerant data packets and non-delay tolerant data packets is determined in accordance with an amount of power available to the communications terminal in combination with a current state for radio communications. Thus non-delay tolerant data packets are prioritised for transmission before delay tolerant data packets depending on whether or not the power available to the communications terminal is below or above a predetermined threshold.

As will be appreciated various combinations of states for radio communications and numbers of data packets present in an input buffer can be combined in order to achieve an improvement in both power conservation for the communications terminal and an efficiency with which communications resources are used.

In one example embodiment a decision as to whether to grant up the link resources to a communications terminals to transmit data packets is determined by an infrastructure equipment of a mobile communications network as a function of the number of delay tolerant data packets and non-delay tolerant data packets in an input buffer of the communications terminal with a current state for radio communications.

Various further aspects and features of the present disclosure are defined in the appended claims and include a method for communicating and infrastructure equipment.

BRIEF DESCRIPTION OF DRAWINGS

Embodiments of the present disclosure will now be described by way of example only with reference to the accompanying drawings wherein like parts are provided with corresponding reference numerals and in which.

DESCRIPTION OF EXAMPLE EMBODIMENTS

Example Network

Figure 1:
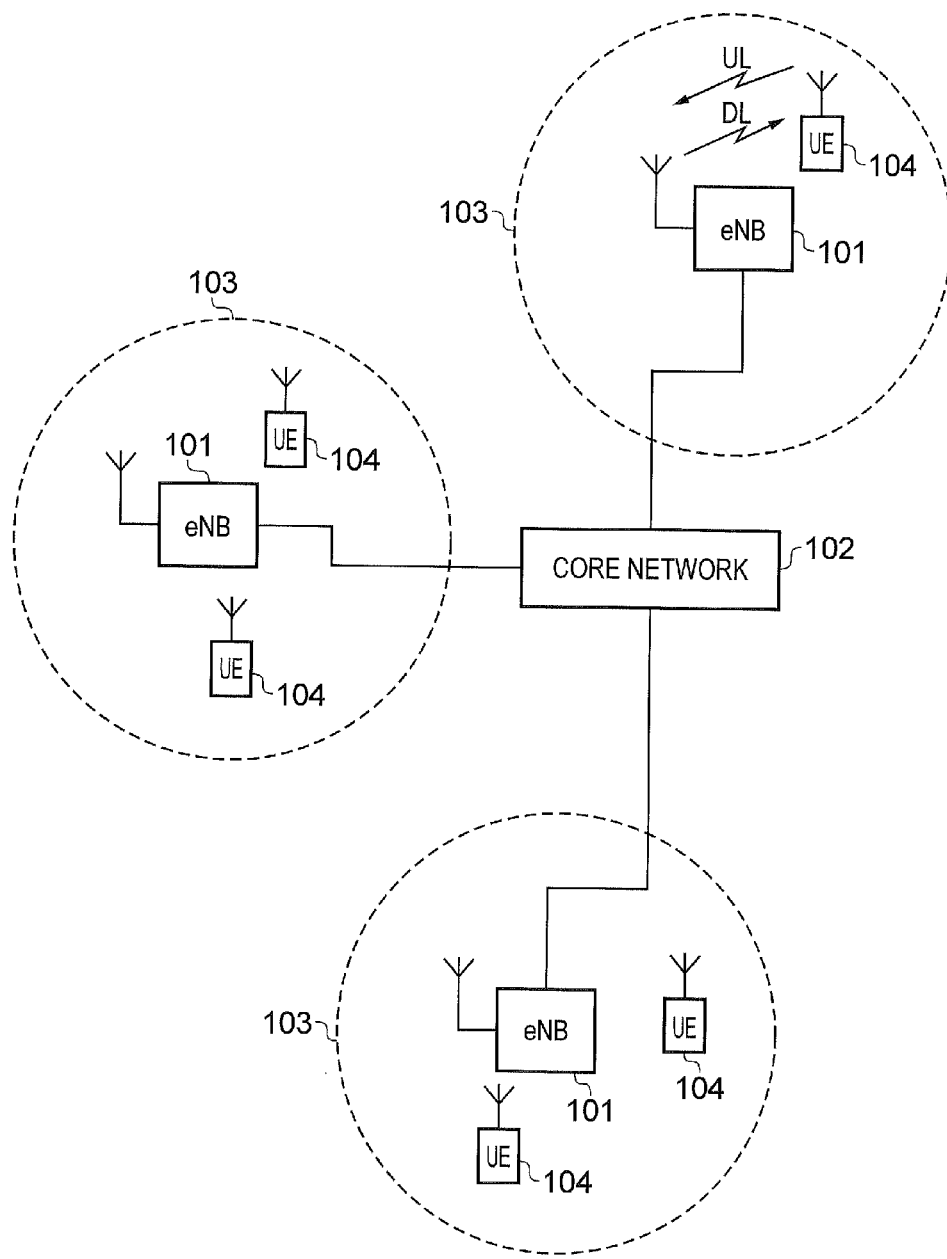
FIG. 1 is a schematic block diagram of a mobile communications system which includes communications terminals (UE) and a base station (eNodeB)

FIG. 1 provides a schematic diagram illustrating the basic functionality of a conventional mobile communications system. In FIG. 1, a mobile communications network includes a plurality of base stations 101 connected to a core network 102. Each base station provides a coverage area 103 (i.e. a cell) within which data can be communicated to and from communications terminals 104. Data is transmitted from a base station 101 to a communications terminal 104 within a coverage area 103 via a radio downlink. The data is transmitted from a communications terminal 104 to a base station 101 via a radio uplink. The core network 102 routes the data to and from the base stations 104 and provides functions such as authentication, mobility management, charging and so on. The base stations 101 provide a wireless access interface comprising the radio uplink and the radio downlink for the communications terminals and form examples of infrastructure equipment or network elements for the mobile communications network, and may be, for the example of LTE, an enhanced Node B (eNodeB or eNB).

The term communications terminals will be used to refer to a communications devices or apparatus which can transmit or receive data via the mobile communications network. Other terms may also be used for communications terminals such as personal computing apparatus, remote terminal, transceiver device or user equipment (UE) which may or may not be mobile. The term UE will be used in the following description interchangeably with communications terminal.

Example Down-Link Configuration

Figure 2:
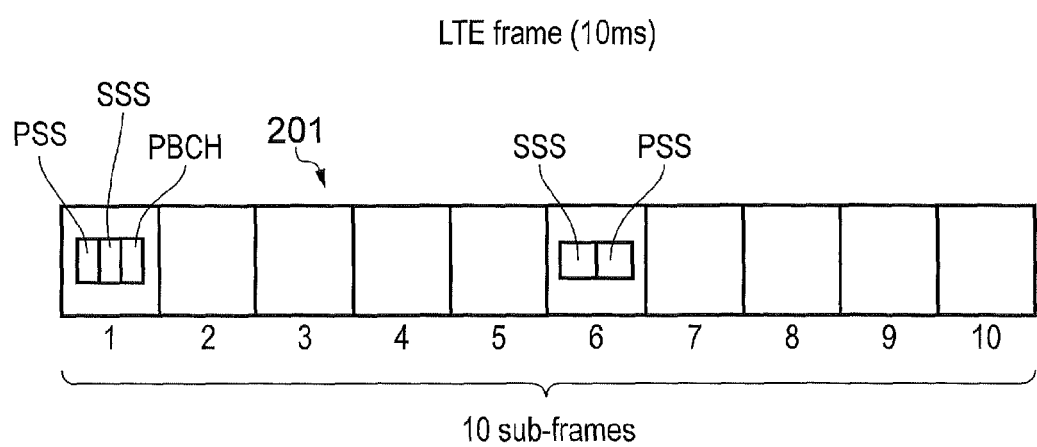
FIG. 2 is a schematic representation of ten sub frames of a downlink part of a wireless access interface.

Mobile telecommunications systems such as those arranged in accordance with the 3GPP defined Long Term Evolution (LTE) architecture use an orthogonal frequency division multiplex (OFDM) based radio access interface for the radio downlink (so-called OFDMA) and the radio uplink (so-called SC-FDMA). Data is transmitted on the radio uplink and on the radio downlink on a plurality of orthogonal sub-carriers. FIG. 2 shows a schematic diagram illustrating an OFDM based LTE downlink radio frame 201. The LTE downlink radio frame is transmitted from an LTE base station and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames (conventionally numbered as sub-frame 0 and 5) of the LTE frame, in the case of frequency division duplex (FDD) system. A physical broadcast channel (PBCH) is transmitted in the first sub-frame of the LTE frame. The PSS, SSS and PBCH are discussed in more detail below.

Figure 3:
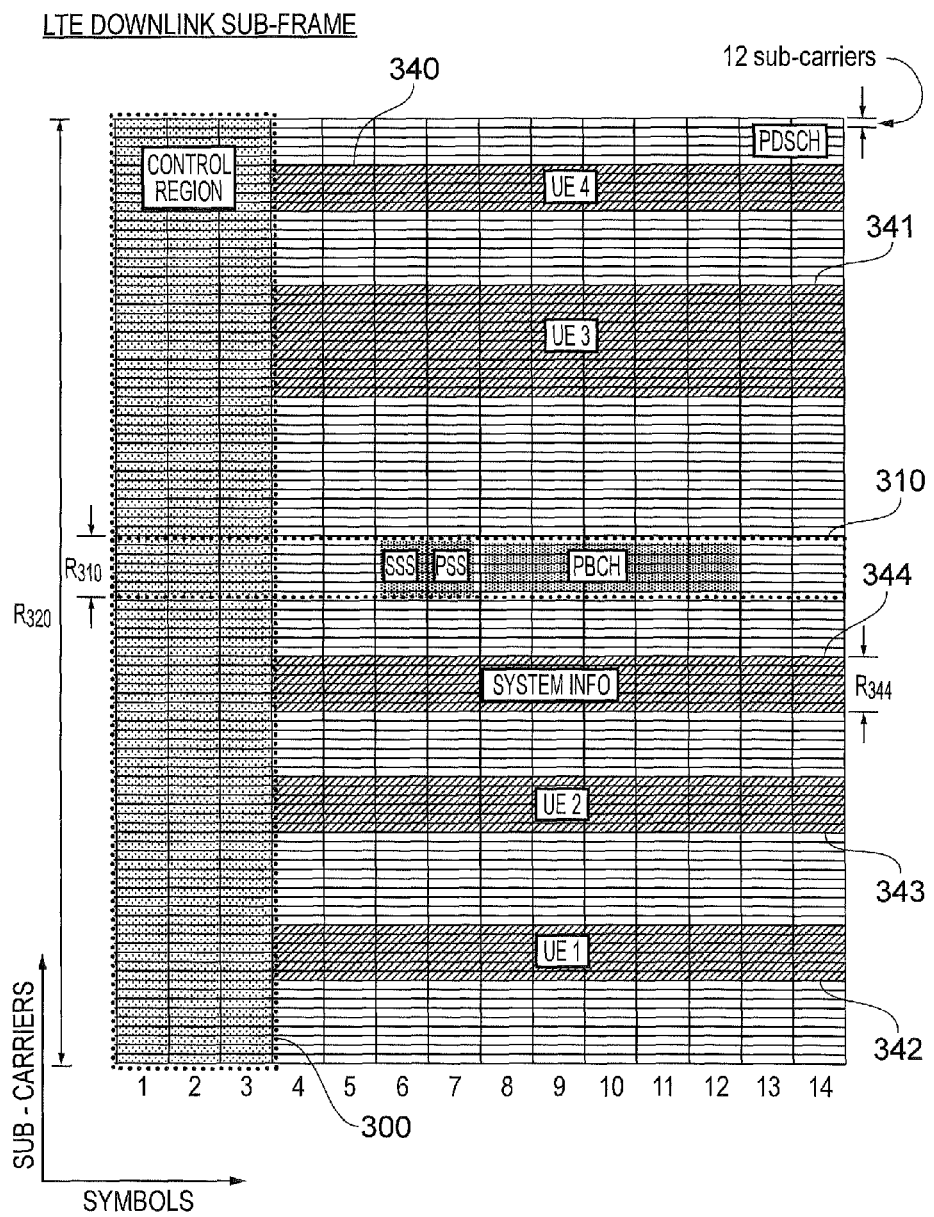
FIG. 3 is a schematic representation of resources of subcarriers and symbols for a sub frame showing in FIG. 2.

FIG. 3 provides a schematic diagram providing a grid which illustrates the structure of an example of a conventional downlink LTE sub-frame. The sub-frame comprises a predetermined number of symbols which are transmitted over a 1 ms period. Each symbol comprises a predetermined number of orthogonal sub-carriers distributed across the bandwidth of the downlink radio carrier.

The example sub-frame shown in FIG. 3 comprises 14 symbols and 1200 sub-carriers spaced across a 20 MHz bandwidth. The smallest unit on which data can be transmitted in LTE is twelve sub-carriers transmitted over one sub-frame. For clarity, in FIG. 3, each individual resource element is not shown, but instead each individual box in the sub-frame grid corresponds to twelve sub-carriers transmitted on one symbol.

FIG. 3 shows resource allocations for four communications terminals 340, 341, 342, 343. For example, the resource allocation 342 for a first communications terminal (UE 1) extends over five blocks of twelve sub-carriers, the resource allocation 343 for a second communications terminal (UE2) extends over six blocks of twelve sub-carriers and so on.

Control channel data is transmitted in a control region 300 of the sub-frame comprising the first n symbols of the sub-frame where n can vary between one and three symbols for channel bandwidths of 3 MHz or greater and where n can vary between two and four symbols for channel bandwidths of 1.4 MHz. The data transmitted in the control region 300 includes data transmitted on the physical downlink control channel (PDCCH), the physical control format indicator channel (PCFICH) and the physical HARQ indicator channel (PHICH).

The PDCCH contains control data indicating which sub-carriers on which symbols of the sub-frame have been allocated to specific communications terminals (UEs). Thus, the PDCCH data transmitted in the control region 300 of the sub-frame shown in FIG. 3 would indicate that UE1 has been allocated the first block of resources 342, that UE2 has been allocated the second block of resources 343, and so on. In sub-frames where it is transmitted, the PCFICH contains control data indicating the duration of the control region in that sub-frame (i.e. between one and four symbols) and the PHICH contains HARQ (Hybrid Automatic Request) data indicating whether or not previously transmitted uplink data has been successfully received by the network.

In certain sub-frames, symbols in a central band 310 of the sub-frame are used for the transmission of information including the primary synchronisation signal (PSS), the secondary synchronisation signal (SSS) and the physical broadcast channel (PBCH) mentioned above. This central band 310 is typically 72 sub-carriers wide (corresponding to a transmission bandwidth of 1.08 MHz). The PSS and SSS are synchronisation sequences that once detected allow a communications terminal 104 to achieve frame synchronisation and determine the cell identity of the base station (eNodeB) transmitting the downlink signal. The PBCH carries information about the cell, comprising a master information block (MIB) that includes parameters that the communications terminals require to access the cell. The data transmitted to individual communications terminals on the physical downlink shared channel (PDSCH) can be transmitted in the remaining blocks of communications resource elements of the sub-frame.

FIG. 3 also shows a region of PDSCH containing system information and extending over a bandwidth of $R_{344}$. Thus in FIG. 3 the central frequency carries control channels such as the PSS, SSS and PBCH and therefore implies a minimum bandwidth of a receiver of a communications terminal.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth as shown in FIG. 3. As is known in the art, subcarriers carrying data transmitted on the PDCCH, PCFICH and PHICH are typically distributed across the entire bandwidth of the sub-frame. Therefore a conventional communications terminal must be able to receive the entire bandwidth of the sub-frame in order to receive and decode the control region.

Example Up-Link Configuration

PUSCH Structure

According to an example embodiment the up-link of a wireless access interface which operates in accordance with LTE is under the control of the eNodeB, which receives buffer status reports (BSR) from UEs to aid scheduling decisions. As with the down-link, the up-link includes a communications channel which provides shared resource known as a physical up-link shared channel (PUSCH) providing resources, which are granted in downlink control information (DCI) messages sent on PDCCH. Communications resources are granted to UEs on a resource block group (RBG) basis, where an RBG can contain two, three or five RBs. The grant of PUSCH resources are in contiguous frequency resources to allow transmission with a low cubic metric since this improves power amplifier efficiency. The exception to this is that, from LTE Rel-10, PUSCH may be granted in two separate 'clusters', with each cluster being individually in contiguous frequency resources. More details can be found relevant 3GPP specifications, for example TS 36.211, TS 36.212, TS 36.213 and TS 36.331.

Figure 4:
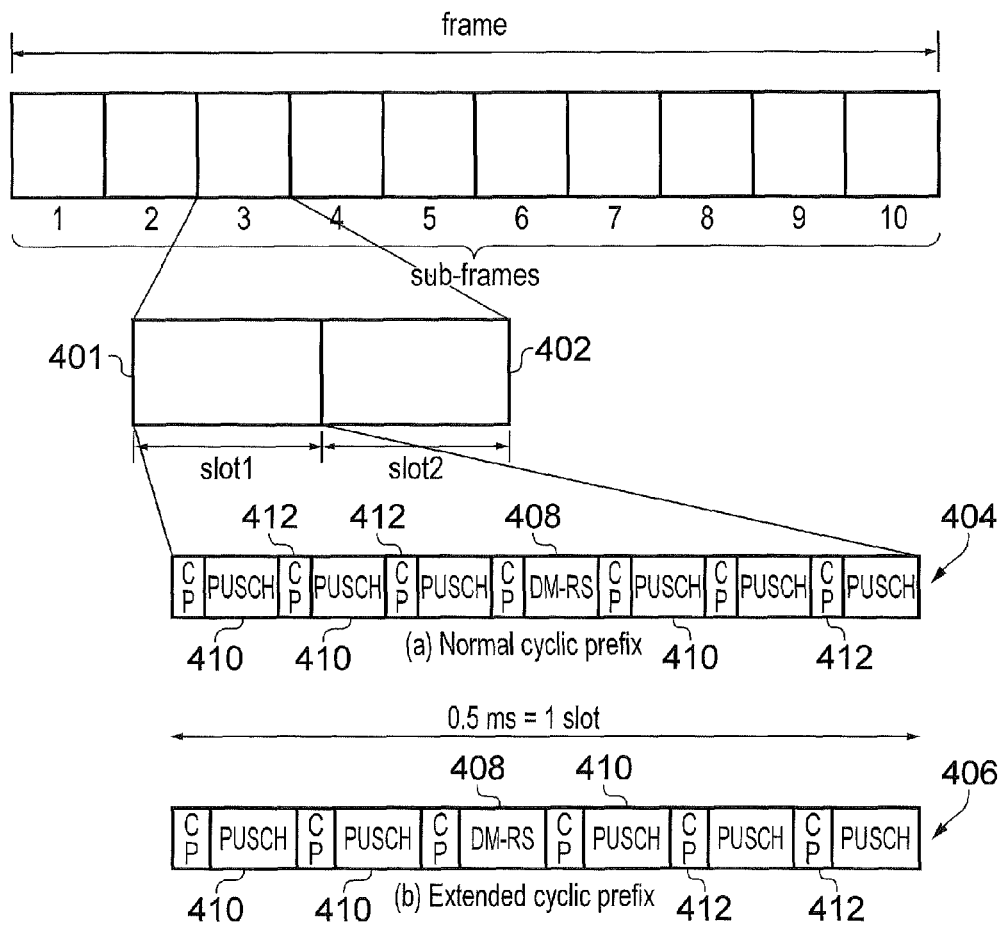
FIG. 4 is a schematic representation of the makeup of a frame and sub frames and timeslots of an uplink of a wireless access interface provided by the communications system showing in FIG. 1.

FIG. 4 provides an example representation of an uplink frame structure. As shown in FIG. 4, each frame of the uplink is comprised of 10 sub-frames in correspondence with the downlink. Each of these sub-frames is comprised of two time slots 401, 402. Each slot is comprised of seven symbols in the time domain, and in the frequency domain each of the symbols provides a plurality of subcarriers which are assigned to the same UE. The resource blocks are assigned in the frequency domain on the basis of 12 sub-carriers so that a UE may be assigned N×12 subcarriers in the frequency domain. Typically, in accordance with a conventional operation, a UE is assigned all of the seven symbols in the time slot 401, 402. As shown in FIG. 4, two examples 404, 406 represent the symbols in each slot which include the PUSCH 408 which, as explained above provides shared physical channel for uplink resources and a modulation reference symbol (DM-RS) 410. Each of the symbols in the time slot includes a cyclic-prefix CP 412 which in correspondence with the principles of OFDM operation provides a repetition of the samples from the wanted channel in a guard period in order to allow for inter-symbol interference.

PUCCH Structure

Figure 5:
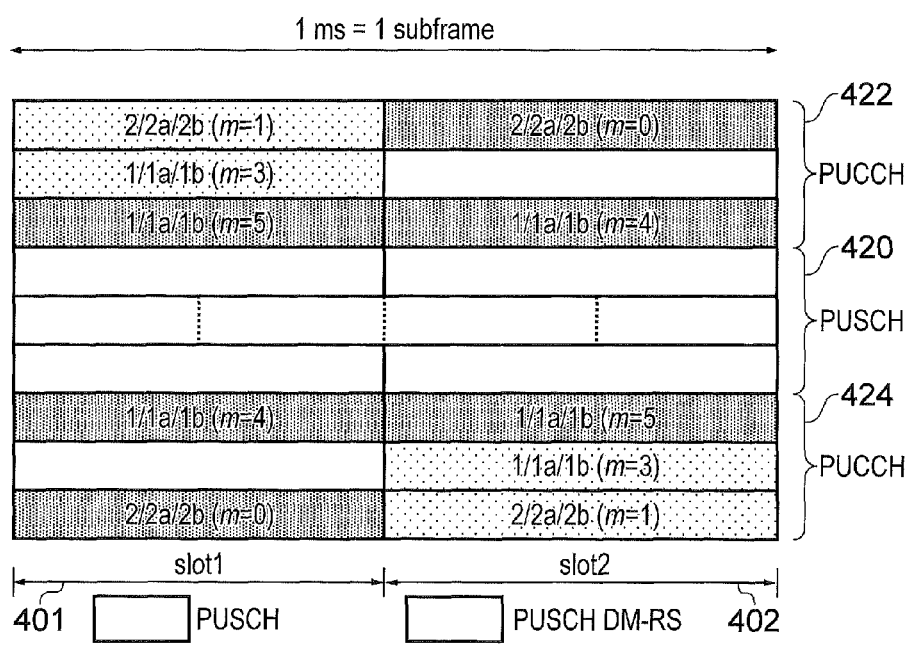
FIG. 5 is a more detailed representation of the makeup of a sub frame of the frame shown in FIG. 4 for the uplink of the wireless access interface which includes an uplink control channel (PUCCH) and an uplink shared channel (PUCCH)

FIG. 5 provides a representation of the structure of a sub-frame for the uplink in the frequency domain. As indicated above each sub-frame is comprised of two time slots 401, 402 within which there is transmitted seven symbols in the time domain and in the frequency domain each symbol is comprised of sub-carriers allocated to the same UE on the basis of N×12 subcarriers. However FIG. 5 is a simplified presentation of the up-link which does not shown the transmission of individual symbols, but shows an example implementation of an uplink control channel which for the example of LTE would be the physical uplink control channel (PUCCH).

As shown in FIG. 5 resource blocks which are allocated to a UE from the shared physical channel PUSCH occupy a central portion of the frequency band 420 whereas the PUCCH is formed at the edges of the frequency band 422, 424. The PUCCH region is therefore two RBs, one in each slot of a sub-frame, which are positioned close to opposite ends of the system bandwidth. Precisely which RBs a PUCCH is allocated depends on the uplink control information (UCI) it is carrying. The format of the PUCCH and on how many RBs the eNodeB allocates in total for PUCCH in a sub-frame. Unlike the PUSCH and the PDSCH, for the example implementation of LTE, the resources for PUCCH are not signalled explicitly on PDCCH, but are instead signalled by RRC configuration combined, in some cases, with implicit information relating to the location of PDCCH. The RRC configuration itself is partly cell-specific and partly UE-specific.

For the example of LTE networks, in Rel-8 and Rel-9, a UE never has PUSCH and PUCCH in the same sub-frame to preserve the low cubic-metric of the transmission. Therefore, when UCI is to be transmitted in a sub-frame where the UE is to have PUSCH, the UCI is multiplexed onto PUSCH and PUCCH is not sent. From Rel-10, simultaneous PUSCH and PUCCH can be configured.

As shown in FIG. 5, the PUCCH is comprised of different formats. The PUCCH formats convey UCI as follows:
  Format 1: Scheduling Request (SR)
  Format 1a: 1-bit HARQ ACK/NACK with or without SR
  Format 1b: 2-bit HARQ ACK/NACK with or without SR
  Format 2: CSI in 20 coded bits (with 1- or 2-bit HARQ ACK/NACK in extended CP)
  Format 2a: CSI and 1-bit HARQ ACK/NACK
  Format 2b: CSI and 2-bit HARQ ACK/NACK
  Format 3: Multiple ACK/NACKs for carrier aggregation with optional SR Transmission of Data Depending on Channel State As mentioned above the embodiments of the present technique provide an arrangement in which a UE can more efficiently communicate via the wireless access interface in order to both save power which is available to the UE and make communicating data more efficient with respect to an overhead of signalling which is required to be communicated more efficient.

Figure 6:
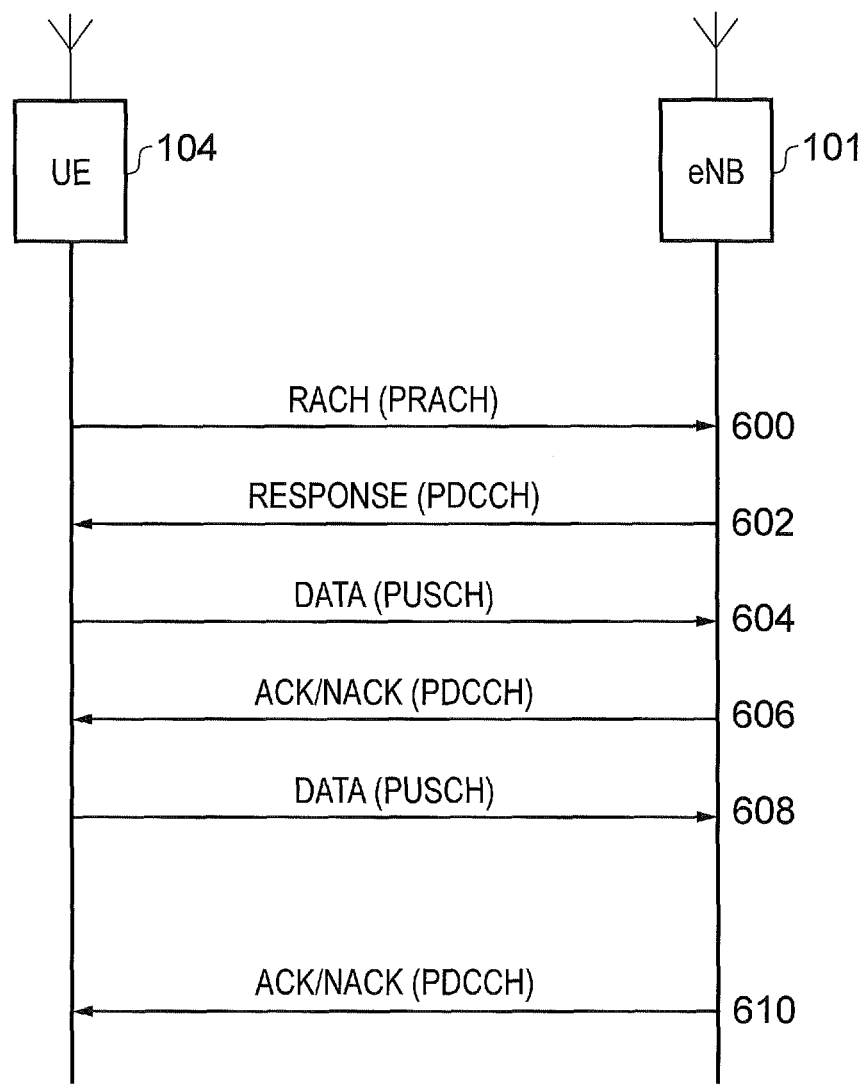
FIG. 6 represents a typical message exchange which is required in order to access resources of an uplink shared channel for transmitting data from the UE to an eNodeB.

As will be appreciated in accordance with the present example of LTE communications, and as explained above both the transmission of data on the uplink and the downlink is via shared resources. Thus the UE receives data on the downlink transmitted on the PDSCH which is a shared downlink channel and transmits data on the uplink on the PUSCH which is a shared uplink channel. In order to gain access to the PUSCH, typically a UE performs a negotiation with the eNodeB 101 as presented in a simplified form as shown in FIG. 6. As shown in FIG. 6, in order to transmit the data on the uplink shared channel the UE 104 transmits a random access request message in a PRACH channel 600 in an uplink random access channel to the eNodeB 101. The eNodeB 101 responds by transmitting a response in the downlink control channel (PDCCH) 602 in which the UE is directed to receive a response message from the PDSCH. The response message provides the UE with an allocation of resources on the uplink shared channel (PUSCH). The UE then transmits data on the PUSCH to the eNodeB and receives acknowledgements for each of the data packets sent using a downlink ACK/NACK message 606. The UE continues to transmit data via the PUSCH and receives corresponding ACK/NACK messages 608, 610 until all the data packets in an input buffer of the UE have been transmitted.

As will be appreciated from the message exchange required to transmit data on the uplink shared channel, a significant amount of signalling messages 600, 602, 606, 610 have to be transmitted in order for the data to be transmitted on the uplink shared channel (PUSCH) via data carrying transmissions 604, 608. Therefore an amount of communications resources required to transmit signalling messages which are required in an active transmission by the UE until the shared channel resources are released, compared with the amount of data transmitted provides a measure of efficiency. Therefore the more data is transmitted the more efficiently the communications resources are being used in order to gain access to the shared channel (PUSCH) as a ratio of the signalling resources required.

As will be appreciated a mobile communications terminal (UE) may be typically mobile and therefore power limited. As will be appreciated transmitting data at a time when radio coverage is poor and therefore the conditions for radio communications are poor in respect of a quality of a radio communications channel may require more power and more communications resources than when the conditions for radio communications are good. This is because for example, a greater amount of processing may be required in terms of error correction encoding and processing requiring a greater amount of data to be communicated compared with a situation when the channel state is good and therefore an amount of error correction and encoding can be reduced. Furthermore, for example when the channel state for radio communications is poor then a transmission power of signals representing the data must be increased in order to effectively communicate the data. In another example a greater number of "NACK" messages may be received, when the channel state is poor, in the message exchange represented in FIG. 6, requiring a greater number of repeated transmissions. Therefore the poorer the channel quality the greater the amount of transmission power, which may be used by a UE to transmit data.

Example Embodiment of the Present Technique

Figure 7:
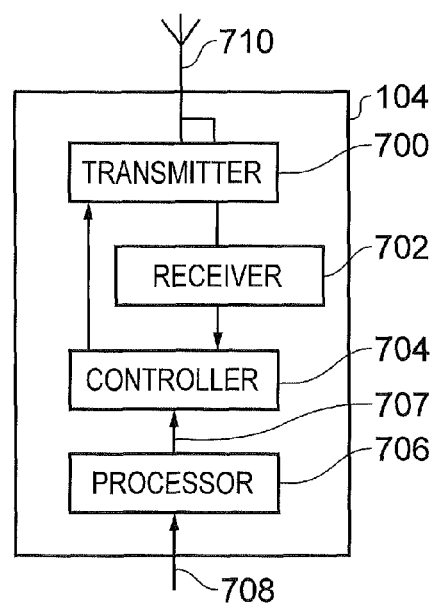
FIG. 7 is a schematic block diagram of an example communications terminal which may be used to implement an example embodiment of the present technique.

FIG. 7 provides an example block diagram providing a simplified representation of components, which may be required to form an example communications terminal (UE). In FIG. 7 a UE 104 is shown to include a transmitter 700 and a receiver 702 which operate to transmit and receive signals respectively via the wireless access interface, for example by the LTE uplink and downlink described with reference to FIGS. 1 to 6. The UE 104 is controlled by a controller 704 which controls the transmitter 700 and receiver 702 to transmit and to receive the data using radio signals. A processor 706 may operate to provide high layer functions such as applications programs and data packet processing such as internet protocol or UDP or similar protocols in order to transmit data packets, for example from one IP address to another IP address via the mobile communications network. Thus the data packets may be received on an input 708 and fed to the processor 706 which feeds the data packets via the controller 704 which controls the transmitter to transmit signals representing the data packets via an antenna 710.

Figure 8:
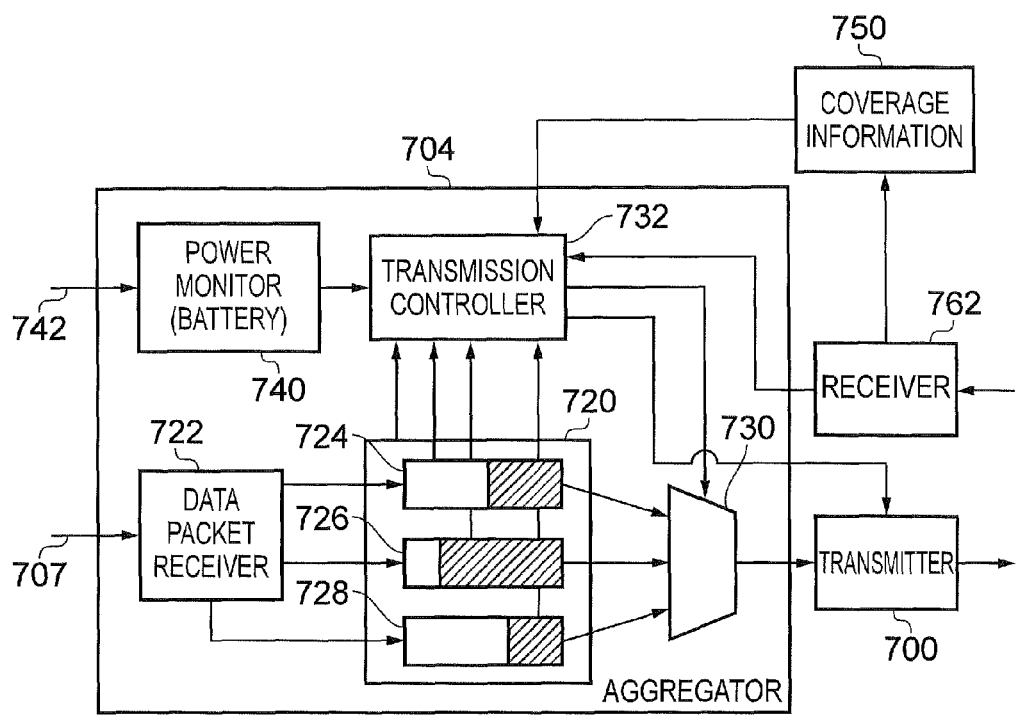
FIG. 8 is a schematic block diagram of an example of the controller shown in FIG. 7 which is adapted to transmit data packets in dependence upon a number and a type of data packets to be transmitted and a current state of radio communications.

In accordance with an example embodiment of the present technique FIG. 8 provides a schematic block diagram of parts which are required to differentiate transmission of data packets fed from a processor 706 to the controller 704 from a connecting channel 707.

As shown in FIG. 8 the controller 704 includes an input data buffer 720 which receives data packets from a data packet receiver 722 and routes the data packet into each of a plurality of data packet queues which respectively queue data packets of different types. Thus each of the data packet queues 724, 726, 728 is arranged to receive and store data packets which have been identified as corresponding to a specific traffic type as identified by the data packet receiver 722. In one example the data packets are internet protocol data packets and are identified from the traffic type in the header, for example best effort, delay tolerant or non-delay tolerant. The input data buffer 720 therefore includes for example an input data queue for delay tolerant data 724 and an input data queue for non-delay tolerant data 726. Data packets which are fed out of the input buffer are fed to an aggregator 730 which forms the data packets together for transmission via the transmitter 700.

Traffic Types

As explained above, the data packet receiver 722 is configured to identify and characterise a respective type of the received packets into at least delay tolerant and non-delay tolerant data packets. The identification of the different packet types can be achieved, for example, by inspecting the header of the data packets, which according some standards can provide an indication of the respective packet type and therefore how the data packets should be treated. In other examples information from an application program can provide an indication of the traffic type. The following provides a non-limiting set of examples:

Traffic Types:
    Maximum delay of non-delay tolerant traffic
    SPS (semi-persistence scheduling) data (which is typically used for Voice over IP traffic in LTE i.e. real-time)
    Guaranteed bit rate or non-guaranteed bit rate
    Logical channel priority
    QoS attribute in LTE/SAE
    ARP (Allocation and Retention priority)
    QCI (QoS Class Identifier)
    Application type
Types of Application:
    Meter reading
    Fire alarm
    Emergency call According to an example embodiment therefore, the input buffer 720 includes as a minimum an input queue 724 for delay tolerant data and an input queue 726 for non-delay tolerant data. The status of each of the input queues 724, 726, 728 within the input buffer 720 are fed to a transmission controller 732 which controls the transmission of the data packets within the input buffer 720 using the aggregator 730 and the transmitter 700 in accordance with predetermined conditions. The predetermined conditions include a current state of a radio channel for communicating the data packets from the transmitter to the eNodeB of the communications network and an amount of data packets within the input queues of the input buffer 720. One example will be explained shortly.

The state of the channel for communicating data packets
    via the uplink of the wireless access interface can in one example be determined from signals received on the downlink. In one example the eNodeB 101 reports back to the UE 104 of a state of received signals from the UE therefore deriving a state of the channel for transmission on the uplink. In another example the UE is able to assess the current state of the radio conditions for transmitting data on the uplink in accordance with a number of negative acknowledgements (NACK) transmitted to the UE on the downlink following transmission of a data packet on the uplink. Accordingly, possible measurement results include: Reference Signal Received Power (RSRP) or Reference Signal Received Quality (RSRQ). Possible threshold is RSRP above X [dBm], RSSP above x [dB].
Channel Quality Indication (CQI) (wideband/sub-band)
Power Head room of UE In a further example the transmission controller 732 also receives an indication of a current level of power which is available to the UE for transmitting or receiving signals using a power monitor 740. The power monitor 740 is connected via an input channel 742 to a battery or power source which provides an indication of a relative amount of power which is available to the UE for transmitting and receiving data. As will be explained in the examples below in one example the transmission controller 732 determines whether or not to transmit data from the input buffer 720 in dependence upon an amount of power which is available to the UE as provided by the power monitor 740 to the transmission controller 732.

In another example the receiver 702 provides information to a coverage information processor 750 which determines a relative metric for radio coverage currently being received by the UE from signals received from the eNodeB of the mobile communications network. The coverage information unit 750 is therefore able to provide a further example indication of a relative state of radio communications for the UE which is used by the transmission controller 732 to schedule the transmission of the data packets from the input buffer 720 via the transmitter 700.

Figure 9:
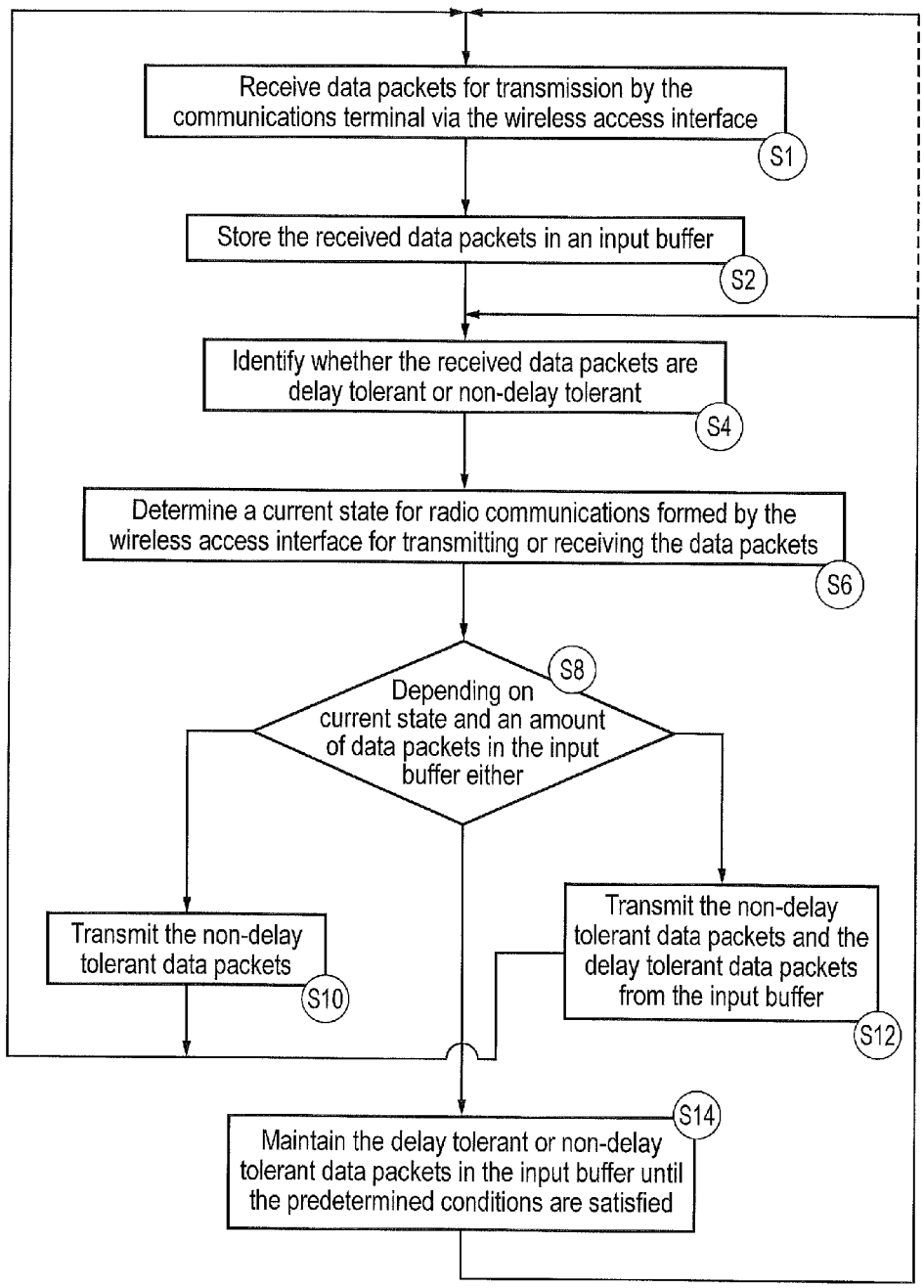
FIG. 9 is a flow diagram providing one example operation of a communications terminal operating in accordance with the present technique.

One example embodiment of the present technique is illustrated by the operation of the transmission controller 732 by the flow diagram shown in FIG. 9. The flow diagram presented in FIG. 9 therefore provides one example operation of the transmission controller 732 to transmit the data packets from the input buffer in accordance with a relative amount of the different types of data packets within the input buffer in combination with the radio conditions currently experienced by the UE. FIG. 9 is therefore summarised as follows:

S1. A communications terminal is configured to transmit and receive data via a wireless access interface provided by a wireless communications network. The communications terminal receives data packets for transmission by the communications terminal via the wireless access interface to the mobile communications network.

S2. The communications terminal stores the received data packets in an input buffer that identifies a predetermined type to which each of the data packets belongs.

S4. The communications terminal identifies and allocates the data packets to different queues or parts of the input data buffer so that a transmission controller can determine how many of each of the different types of data packets there are present in the input buffer.

S6. The communications terminal determines a current state for radio communications formed by the wireless access interface for transmitting or receiving the data packets. In particular the communications terminal is concerned with the current radio conditions for transmitting the data packets. The radio conditions include whether the communications terminal is or has recently handed over from one base station to another changing a tracking area for example or the current state of the radio channel in respect of a quality of data communications via the shared uplink channel.

S8. The communications terminal then compares the current state of the radio communications channel and an amount of data packets in the input buffer to determine whether or not to transmit the data packets and if so whether these should be the non-delay tolerant data packets or the delay tolerant data packets or both.

S10. Depending on the current state of the radio communications channel the communications terminal may transmit the non-delay tolerant data packets. Since these data packets are not tolerant to delays, provided the radio communications channel is at a minimum quality level, the communications terminal transmits the non-delay tolerant data packets without further delay.

S12. If the current channel state is better than the channel state determined in S10 and such that the delay tolerant and non-delay tolerant data packets can be transmitted then the communications terminal determines that the channel state is enough to transmit the non-delay tolerant data packets from the input buffer and also transmits these with the delay tolerant data packets from the input buffer. Thus by aggregating the transmission of delay tolerant and non-delay tolerant data packets an improvement is achieved with respect to an efficiency with which the data packets are compared to the amount of signalling data required to communicate the data packets.

S14. If however the communications conditions are below a predetermined threshold then the delay tolerant and non-delay tolerant data packets are maintained in the input buffer until the predetermined conditions are satisfied. As such the processing proceeds back to step S4 but could proceed to step S1 to receive new data packets. In this example the radio communications conditions are not sufficient to transmit the delay tolerant or the non-delay tolerant data packets and in this example the non-delay tolerant data packets may be discarded.

Figure 10:
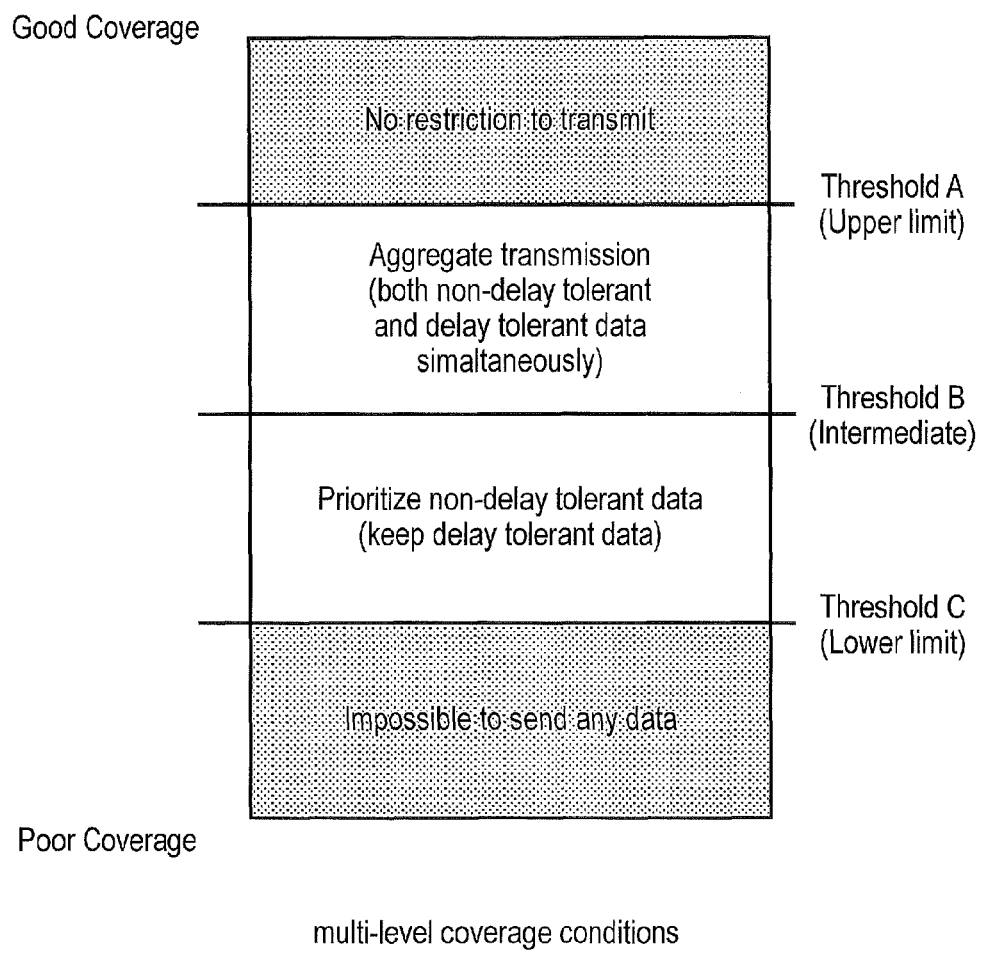
FIG. 10 is a schematic representation in graphical form showing predetermined conditions of radio channel with respect to three thresholds A, B and C of quality metric.

An example explanation of the respective predetermined conditions which can be applied in the example embodiment of the present technique is shown in FIG. 10. As can be seen from FIG. 10 there are three thresholds A, B and C representing predetermined conditions for radio communications. As a first threshold A, if the radio conditions are above a predetermined quality metric then there is no restriction on the transmission of delay tolerant and non-delay tolerant data packets. However if the radio conditions are below the threshold A but are better than or equal to a threshold B which represents intermediate conditions, that is the channel quality metric is worse than threshold A but better than threshold B, then the communications terminal may buffer delay tolerant data packets until a predetermined amount of tolerant data packets are present in the input buffer in which case the data packets are transmitted. If however a non-delay tolerant data packet is received then this data packet is transmitted immediately with any delay tolerant data packets which are present in the input buffer.

If the radio conditions are worse than threshold B but better than a threshold C as determined by a channel quality metric of the radio communications channel then only the non-delay tolerant data packets are transmitted. If however the quality metric of the radio communications channel is below threshold C then no data packets are transmitted and these data packets are either buffered in the input buffer if they can be delayed or if they cannot be delayed then for example the non-delay tolerant data packets.

Conditional Transmission Based on Available Power

Figure 11:
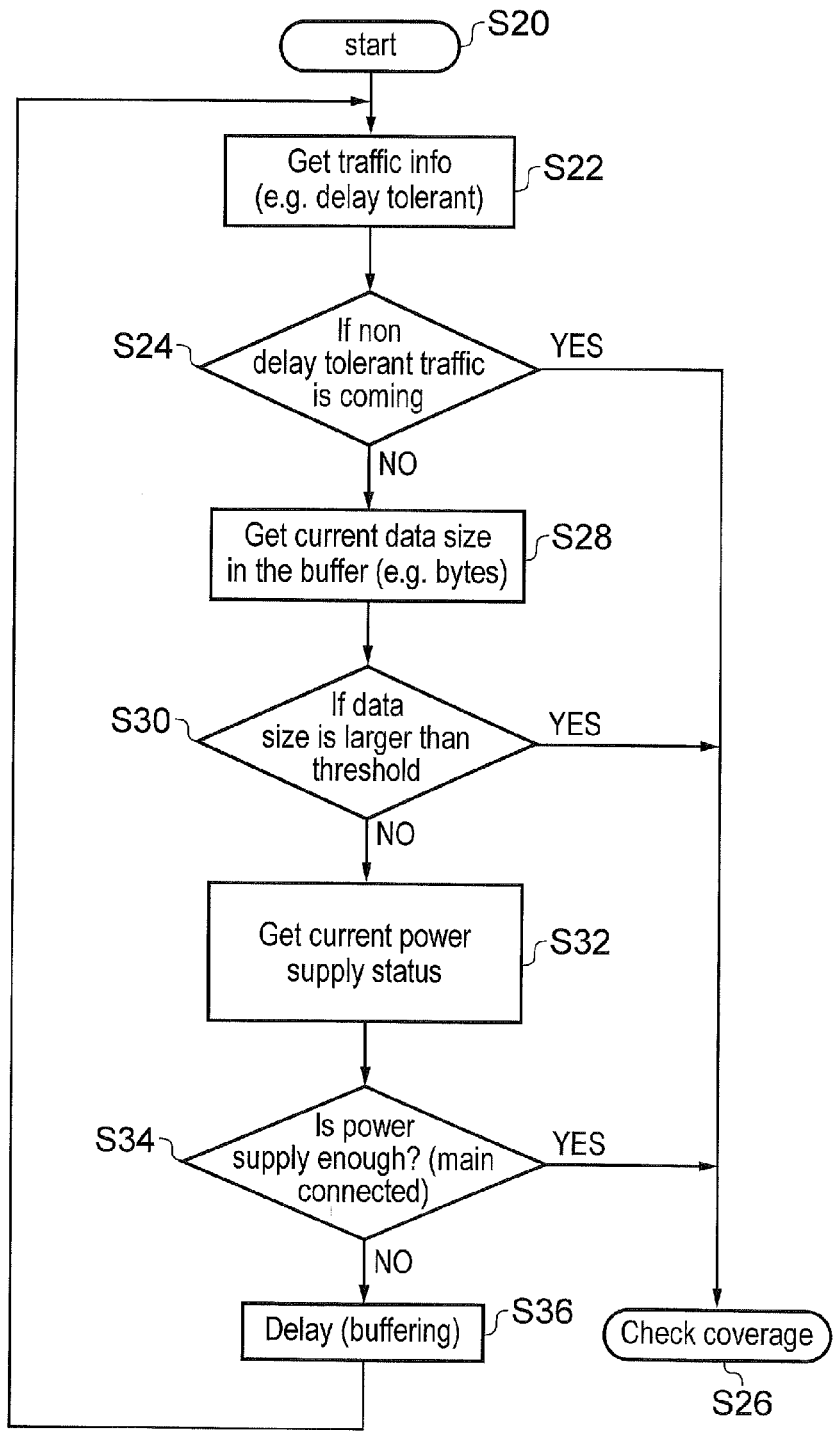
FIG. 11 is a flow diagram illustrating the operation of a controller to determine whether or not to transmit the data packets in accordance with their type and an amount of the data packets of each type and including a current state of a power supply available to a communications terminal.

As will be appreciated from the description above, in addition to the state of radio communications for transmitting the data packets on the uplink, or as a separate condition, a decision as to whether to transmit delay tolerant data packets or non-delay data packets may also be influenced by a current level of power which is available to the communications terminal. For example, depending on the amount of power available, for example if this is below a predetermined threshold, then only non-delay tolerant data may be transmitted. An illustrative example of the operation of a communications terminal to transmit data packets depending on an amount of power available to the communications terminal is shown in FIG. 11 which is summarised as follows:

S20. From a start position the communications terminal determines an amount of delay tolerant and non-delay tolerant data packets in the input buffer in step S22.

S24. The controller determines if there is one or more non-delay tolerant data packet received in the input buffer. If yes then processing proceeds to step S26 and the current coverage in terms of the radio communications conditions are determined and the relative thresholds applied to determine whether or not the non-delay tolerant data should be transmitted as explained above with reference to FIG. 10.

S28. If there is no non-delay tolerant data packet being received then the current size of the input buffer is determined.

S30. If the number delay tolerant data packets in the input buffer is larger than a predetermined threshold then processing proceeds to S26 to determine whether or not the data packets should be transmitted in accordance with the current state of radio communication conditions as represented by FIG. 10.

S32. If the number of data packets of delay tolerant data has not reached a predetermined number then the controller determines the current amount of power available for transmitting data packets.

S34. If the determined power is above a predetermined threshold then processing proceeds to S26. Otherwise processing proceeds to step S36 and the delay tolerant data packets are maintained in the input buffer and not transmitted and processing proceeds to step S22.

According to some examples, if the battery power level is below a predetermined level then the UE does not send the data. However, when the battery is being charged (i.e. main connected), UE may send the data packets which are present in the input buffer. The transmission of the delay and non-delay tolerant data packets can be therefore determined in dependence upon the remaining power in the battery (e.g. percentage) or if mains power is connected (Battery being charged) or not (battery operation).

Transmission on Handover

In one example embodiment the current state for radio communications includes whether the communications terminal has detached or is about to handover from a first infrastructure equipment of the mobile communications network and re-attached or is about to handover to a second infrastructure equipment in accordance with a hand-over procedure. If the communications terminal has performed or is about to perform a handover procedure, the controller is configured to transmit any delay tolerant and non-delay tolerant data packets from the input buffer to the mobile communications network. In one example, the delay tolerant and non-delay tolerant data packets are transmitted in accordance with the abovementioned channel conditions and buffer status even if a handover occurs, but all non-delay tolerant and delay tolerant data packets are transmitted if a tracking area update is performed.

According to another example embodiment, if there is a change in the status of the RRC connection of the UE then the UE transmits all of the data packets from the input buffer. For example, UE may keep the data in the buffer in idle mode. When UE needs to change the RRC state e.g. Periodic Tracking Area Update (TAU) transmission, then the UE transmits all of the stored data packets during idle mode and TAU message.

Example Architecture

Figure 12:
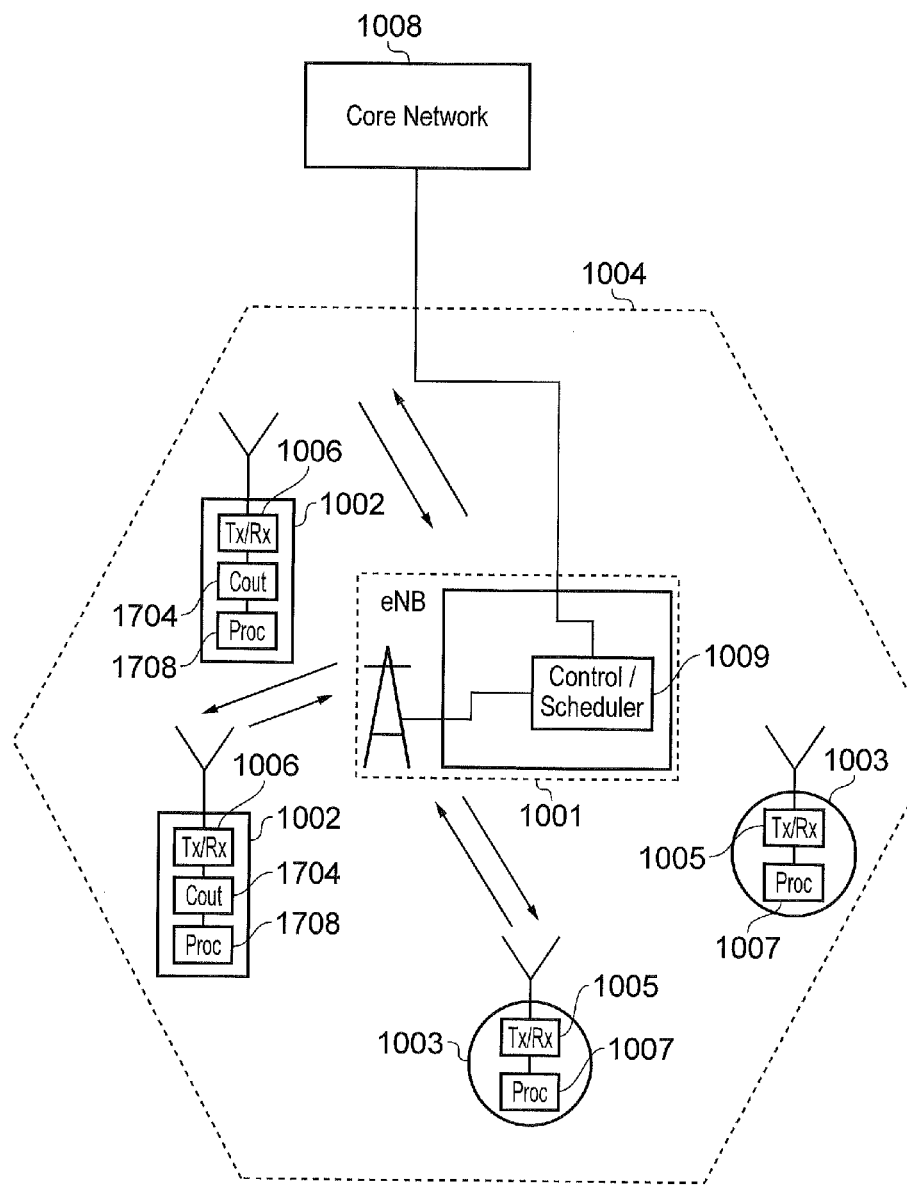
FIG. 12 is an example mobile communications system embodying the present technique.

FIG. 12 provides a schematic diagram showing part of an adapted LTE mobile telecommunication system arranged in accordance with an example of the present disclosure. The system includes an adapted enhanced Node B (eNB) 1001 connected to a core network 1008 which communicates data to a plurality of conventional LTE terminals 1003, 1007 and reduced capability communications terminals 1002 within a coverage area (i.e. cell) 1004. Each of the reduced capability terminals 1002 has a transceiver unit 1005 which includes a receiver unit capable of receiving signals via a wireless access interface provided by the eNodeB 1001 and a transmitter unit capable of transmitting signals via the wireless access interface.

In one example embodiment the example reduced capability terminals 1002 include a processor 1708 and a controller 1704 which are adapted to perform the process steps referred to above with reference to FIGS. 7 to 11. Thus, in this example configuration architecture the controller 1704 forms the controller 704 shown in FIGS. 7 and 8 and includes an input buffer 720. Thus the controller 1704 includes the transmission controller 732 which is shown in FIG. 8 and operates in combination with the transceiver 1006 which is shown in FIG. 8 as receiver 702 and transmitter 700.

In another example embodiment of the present technique which will be explained below the eNodeB 1001 includes a scheduler 1009 which is adapted to perform the decision-making in order to perform the determination as to whether or not to grant uplink communications resources for the transmission of data packets from the input buffer 720 to the eNodeB via the wireless access interface. This is explained in the following section.

eNodeB Decision Making

Figure 13:
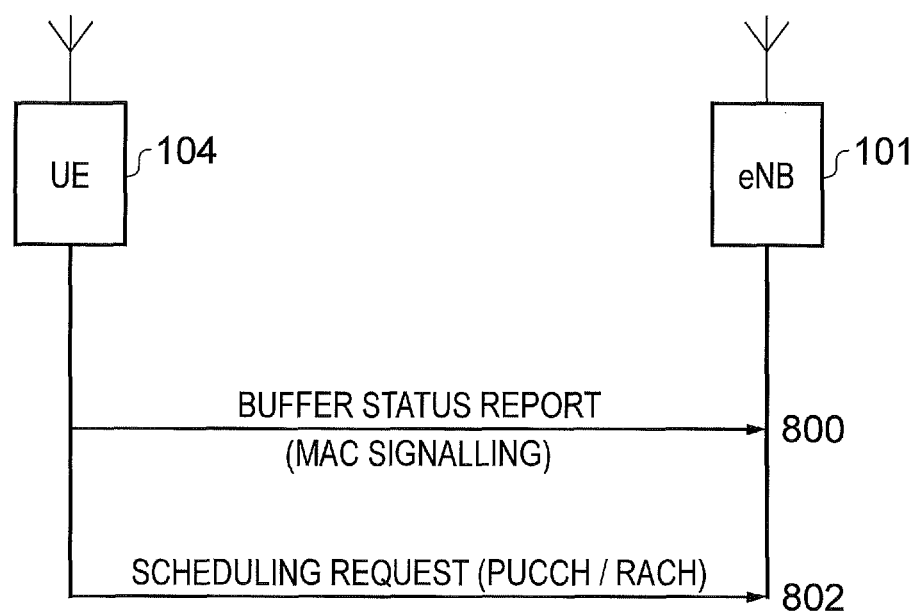
FIG. 13 is a schematic representation of a message exchange in which a communications terminal transmits a buffer status and signalling requests to a base station (eNodeB)

As explained above the controller 1704 within the UE determines whether or not to transmit the delay tolerant data packets or non-delay tolerant data packets depending on a current state for radio communications and an amount of the data packets present in the input buffer 720. In one embodiment, the eNodeB determines whether or not the data packets in the input buffer 720 should be transmitted or not depending on the predetermined conditions as set out above. Such an example embodiment would utilise the message exchange as shown in FIG. 13. As shown in FIG. 13, the UE 104 transmits to the eNodeB 101 a current state of the input buffer in respect of the number of each of the different types of data packets in the input buffer as indicated by a message 800 as shown in FIG. 13. Thus in FIG. 13 the message 800 may be transmitted on a regular basis using MAC layer signalling indicating a status of the input buffer to the eNodeB. Accordingly, when the UE 104 makes a request to transmit the data packets using an PRACH or PUCCH message the eNodeB can determine whether or not to grant the uplink resources depending on the current status of the input buffer and/or the current state of the radio communications channel.

Figure 14:
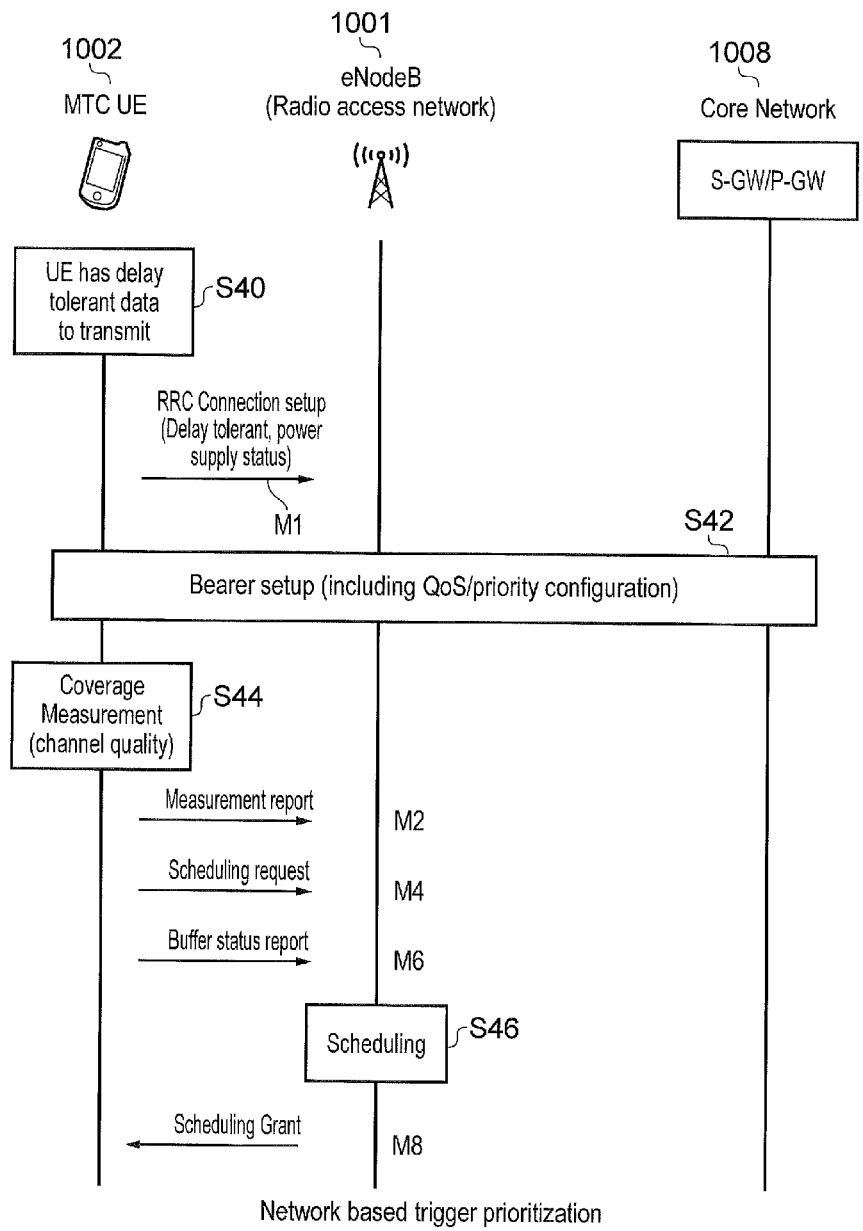
FIG. 14 is a schematic flow diagram including a message exchange which illustrates an operation in which a communications terminal transmits measurement reports and buffer status to a mobile communications network to enable a base station of a network to determine whether predetermined conditions have been met to transmit data packets from an input buffer of the communications terminal.

FIG. 14 provides a more detailed example of the scheduling of delay tolerant data packets or non-delay tolerant data packets as determined by the mobile communications network. As shown in FIG. 14, in step S40 the UE determines whether it has delay tolerant data to transmit. If the UE does have delay tolerant data transmit then the UE transmits an RRC connection set up message including the delay tolerant input buffer status and power supply status information in a message M1. Thus the message M1 which is an RRC connection set up request is adapted to include an indication of the amount of delay tolerant data packets in the input buffer and a status of a power supply of the UE.

There then follows a sequence of message exchanges and processes referred to generally as a bearer setup S42 in which the UE 104 and the network 102 establish a bearer including a quality of service and a priority configuration for transmitting the data packets.

The UE then determines a current coverage or channel quality state which is available for transmitting the data packets on the uplink shared channel S44. The UE then communicates a measurement report of the current state for radio communications using a message M2 and transmits a scheduling request to access the shared uplink resources for transmitting the data packets using a message M4 and transmits a status of its input buffer in a message M6. The eNodeB then schedules an allocation of the uplink resources in a step S46 and then transmits the scheduling of the uplink resources in a grant message M8 which is transmitted to the UE on the downlink PDCCH. Thus, is accordance with the operation represented in FIG. 14, a decision as to whether to grant the uplink resources is performed by an adapted scheduler in step S46 based on the report of the current channel state and the buffer status of the input buffer of the UE and/or a current state of the power supply of the UE. Based on this information the scheduler and the eNodeB applies the predetermined conditions for determining whether to grant uplink resources to transmit the data packets which may also depend on the number of delay tolerant and non-delay tolerant data packets present in the input buffer.

Application to MTC-Type Devices

The abovementioned embodiments can be used by MTC terminals. To support MTC terminals, it has been proposed to introduce a "virtual carrier" operating within a bandwidth of one or more "host carriers": the proposed virtual carrier concept preferably integrates within the communications resources of conventional OFDM based radio access technologies and subdivides frequency spectrum in a similar manner to OFDM. Unlike data transmitted on a conventional OFDM type downlink carrier, data transmitted on the virtual carrier can be received and decoded without needing to process the full bandwidth of the downlink OFDM host carrier. Accordingly, data transmitted on the virtual carrier can be received and decoded using a reduced complexity receiver unit: with concomitant benefits such as increased simplicity, increased reliability, reduced form-factor and lower manufacturing cost. The virtual carrier concept is described in a number of co-pending patent applications (including GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]), the contents of which are incorporated herein by reference.

Accordingly it will be appreciated that the techniques described above in which data packets are transmitted as a function of their tolerance to delay and a state for radio communications can be used with MTC devices transmitting or receiving data on a virtual carrier. As has been explained above, because the reduced complexity terminals 1002 receive and transmit data across a reduced bandwidth on the uplink and downlink virtual carriers, the complexity, power consumption and cost of the transceiver unit 1006 needed to receive and decode downlink data and to encode and transmit uplink data is reduced compared to the transceiver unit 1005 provided in the conventional LTE terminals 1003.

In some examples, the virtual carrier inserted within the host carrier can be used to provide a logically distinct "network within a network". In other words data being transmitted via the virtual carrier can be treated as logically and physically distinct from the data transmitted by the host carrier network. The virtual carrier can therefore be used to implement a so-called dedicated messaging network (DMN) which is "laid over" a conventional network and used to communicate messaging data to DMN terminals (i.e. virtual carrier terminals).

Various modifications can be made to examples of the present disclosure. Furthermore, it will be understood that the general principle of inserting a virtual carrier on a subset of uplink or downlink resources can be applied to any suitable mobile telecommunication technology and need not be restricted to systems employing an LTE based radio interface.

According to another example aspect there is provide a communications terminal comprising a transmitter configured to transmit signals to a wireless communications network via a wireless access interface provided by the wireless communications network. The communications terminal also comprises a receiver configured to receive signals from the wireless communications network, and a controller configured to control the transmitter and the receiver to transmit and receive the signals, wherein the controller includes an input buffer for receiving data packets for transmission as the signals via the wireless access interface. The controller is configured to identify whether the received data packets are delay tolerant or non-delay tolerant, to determine in combination with signals received from the receiver an indication of a current state for radio communications formed by the wireless access interface for transmitting the data packets via the wireless access interface, and in accordance with the predetermined conditions which include a current state for radio communications and an amount of the delay tolerant data packets in the input buffer and an amount of the non-delay tolerant packets in the input buffer either to transmit the non-delay tolerant data packets or to transmit the non-delay tolerant data packets and the delay tolerant data packets from the input buffer to the mobile communications network using the transmitter, or maintaining the delay tolerant or non-delay tolerant data packets in the input buffer until the predetermined conditions are satisfied.

The following numbered clauses provide further example aspects and features of the present technique:

1. A communications terminal comprising a transmitter configured to transmit signals to a wireless communications network via a wireless access interface provided by the wireless communications network, and a receiver configured to receive signals from the wireless communications network, and a controller configured to control the transmitter and the receiver to transmit and receive the signals, wherein the controller includes an input buffer for receiving data packets for transmission as the signals by the communications terminal via the wireless access interface, and the controller is configured to identify whether the received data packets are delay tolerant or non-delay tolerant, to determine in combination with signals received from the receiver an indication of a current state for radio communications formed by the wireless access interface for transmitting the data packets via the wireless access interface, and in accordance with predetermined conditions which include a current state for radio communications and an amount of the delay tolerant data packets in the input buffer and an amount of the non-delay tolerant packets in the input buffer either to transmit the non-delay tolerant data packets or to transmit the non-delay tolerant data packets and the delay tolerant data packets from the input buffer to the mobile communications network using the transmitter, or maintaining the delay tolerant or non-delay tolerant data packets in the input buffer until the predetermined conditions are satisfied.

2. A communications terminal according to clause 1, comprising a power monitoring circuit for monitoring an amount of power which is available to the transmitter and the receiver to transmit or to receive the data via the wireless access interface, wherein the predetermined conditions used by the controller to determine whether to transmit the non-delay tolerant data packets or to transmit the non-delay tolerant data packets and the delay tolerant data packets from the input buffer to the mobile communications network using the transmitter includes the amount of power available to the transmitter to transmit the data packets in combination with the current state for radio communications.

3. A communications terminals according to clause 2, wherein the controller is configured to determine whether the amount of power available is above or below a power threshold and if the amount of power available is below the power threshold only transmitting the non-delay tolerant data packets, and if the amount of power available is above the power threshold transmitting the non-delay tolerant data packets and the delay tolerant data packets.

4. A communications terminal according to clause 1, 2 or 3, wherein the current state of radio communications is determined by the controller from signals received by the receiver from data transmitted by the mobile communications network, the receiver providing to the controller a channel quality measurement indicator, and the predetermined conditions include whether the channel quality measurement indicator indicates a quality for radio communications above a first predetermined level, and if the channel quality measurement for radio communications is above the first predetermined threshold the controller is configured to transmit the delay tolerant data packets or non-delay tolerant data packets when present in the input buffer.

5. A communications terminal according to clause 4, wherein the predetermined conditions include whether the channel quality measurement indicator indicates a quality for radio communications below the first predetermined threshold and above a second predetermined level, and if the channel quality measurement for radio communications is above the second predetermined threshold and below the first predetermined threshold the controller is configured to transmit the delay tolerant data packets if the number of delay tolerant data packets in the input buffer has reached a predetermined amount, and to transmit the delay tolerant data packets from the input buffer with non-delay tolerant data packets, when there is at least one non-delay tolerant data packet present in the input buffer.

6. A communications terminal according to clause 4 or 5, wherein the predetermined conditions include whether the channel quality measurement indicator indicates a quality for radio communications below the first predetermined threshold, below the second predetermined threshold and above a third predetermined level, and if the channel quality measurement for radio communications is above the third predetermined threshold and below the first and second predetermined thresholds the controller is configured to transmit the non-delay tolerant data packets and to maintain the non-delay tolerant data packets in the input buffer until the channel quality measurement indicator indicates a quality above the first or second predetermined threshold.

7. A communications terminal according to any of clauses 1 to 6, wherein the current state for radio communications includes whether the communications terminal has detached from a first infrastructure equipment of the mobile communications network and re-attached to a second infrastructure equipment in accordance with a hand-over procedure, and if the communications terminal has performed a handover procedure, the controller is configured to transmit any delay tolerant and non-delay tolerant data packets from the input buffer to the mobile communications network.

8. A method of communicating data from a communications terminal to a wireless communications network, the method comprising transmitting signals to the wireless communications network via a wireless access interface provided by the wireless communications network, receiving signals from the wireless communications network, and controlling the transmitting and the receiving of the signals, wherein the controlling includes receiving data packets for transmission by the communications terminal via the wireless access interface, storing the data packets in an input buffer, identifying whether the received data packets are delay tolerant or non-delay tolerant, determining in combination with the received signals an indication of a current state for radio communications formed by the wireless access interface for transmitting the data packets via the wireless access interface, and in accordance with predetermined conditions which include a current state for radio communications and an amount of the delay tolerant data packets in an input buffer and an amount of the non-delay tolerant packets in the input buffer determining whether to transmit the non-delay tolerant data packets, or to transmit the non-delay tolerant data packets and the delay tolerant data packets from the input buffer to the mobile communications network using the transmitter, or to maintain the delay tolerant or delay tolerant data packets in the input buffer until the predetermined conditions are satisfied.

9. A method of communicating according to clause 8, comprising monitoring an amount of power which is available to transmit or to receive the data via the wireless access interface, wherein the predetermined conditions for determining whether to transmit the non-delay tolerant data packets or to transmit the non-delay tolerant data packets and the delay tolerant data packets from the input buffer to the mobile communications network includes the amount of power available to the transmitter to transmit the data packets in combination with the current state for radio communications.

10. A method of communicating according to clause 9, wherein the predetermined conditions for determining whether to transmit the non-delay tolerant data packets or to transmit the non-delay tolerant data packets and the delay tolerant data packets from the input buffer to the mobile communications network includes determining whether the amount of power available is above or below a power threshold and if the amount of power available is below the power threshold only transmitting the non-delay tolerant data packets, and if the amount of power available is above the power threshold transmitting the non-delay tolerant data packets and the delay tolerant data packets.

11. A method of communicating according to clause 8, 9 or 10, comprising determining the current state of radio communications from the signals received from the mobile communications network, providing to the controller a channel quality measurement indicator, and the predetermined conditions for determining whether to transmit the non-delay tolerant data packets or to transmit the non-delay tolerant data packets and the delay tolerant data packets from the input buffer to the mobile communications network include whether the channel quality measurement indicator indicates a quality for radio communications above a first predetermined level, and if the channel quality measurement for radio communications is above the first predetermined threshold transmitting the delay tolerant data packets or non-delay tolerant data packets when present in the input buffer.

12. A method of communicating according to clause 11, wherein the predetermined conditions include whether the channel quality measurement indicator indicates a quality for radio communications below the first predetermined threshold and above a second predetermined level, and if the channel quality measurement for radio communications is above the second predetermined threshold and below the first predetermined threshold transmitting the delay tolerant data packets if the number of delay tolerant data packets in the input buffer has reached a predetermined amount, and to transmit the delay tolerant data packets from the input buffer with and non-delay tolerant data packets, when there is at least one non-delay tolerant data packet present in the input buffer.

13. A method of communicating according to clause 11 or 12, wherein the predetermined conditions include whether the channel quality measurement indicator indicates a quality for radio communications below the first predetermined threshold, below the second predetermined threshold and above a third predetermined level, and if the channel quality measurement for radio communications is above the third predetermined threshold and below the first and second predetermined thresholds transmitting the non-delay tolerant data packets and to maintain the delay tolerant data packets in the input buffer until the channel quality measurement indicator indicates a quality above the first or second predetermined threshold.

14. A method of communicating according to any of clauses 8 to 13, wherein the current state for radio communications includes whether the communications terminal has detached from a first infrastructure equipment of the mobile communications network and re-attached to a second infrastructure equipment in accordance with a hand-over procedure, and if the communications terminal has performed a handover procedure, transmitting any delay tolerant and non-delay tolerant data packets from the input buffer to the mobile communications network.

15. A computer program providing computer executable software, which when loaded onto a computer and executed performs the method according to any of clauses 8 to 13.

The invention claimed is:

1. A communications terminal comprising:
a transmitter configured to transmit signals to a wireless communications network via a wireless access interface provided by the wireless communications network, and
a receiver configured to receive signals from the wireless communications network, and
a controller configured to control the transmitter and the receiver to transmit and receive the signals, wherein the controller includes an input buffer for receiving data packets for transmission as the signals by the communications terminal via the wireless access interface, and the controller is configured:
to identify whether the received data packets are delay tolerant or non-delay tolerant,
to determine in combination with signals received by the receiver an indication of a current state for radio communications formed by the wireless access interface for transmitting the data packets via the wireless access interface, and
in accordance with predetermined conditions, which include the current state for radio communications, an amount of the delay tolerant data packets in the input buffer, and an amount of the non-delay tolerant packets in the input buffer to one of:
transmit the non-delay tolerant data packets to the mobile communications network using the transmitter,
aggregate the non-delay tolerant data packets and the delay tolerant data packets together, and transmit the aggregated non-delay tolerant data packets and delay tolerant data packets to the mobile communications network using the transmitter, and
maintain both the delay tolerant data packets and the non-delay tolerant data packets in the input buffer until the predetermined conditions are satisfied.

2. The communications terminal as claimed in claim 1, comprising:
a power monitoring circuit configured to monitor an amount of power which is available to the transmitter and the receiver to transmit or to receive the data via the wireless access interface,
wherein the predetermined conditions used by the controller to determine whether to transmit the non-delay tolerant data packets or to transmit the non-delay tolerant data packets and the delay tolerant data packets from the input buffer to the mobile communications network using the transmitter includes the amount of power available to the transmitter to transmit the data packets in combination with the current state for radio communications.

3. The communications terminals as claimed in claim 2, wherein the controller is configured to determine whether the amount of power available is above or below a power threshold and if the amount of power available is below the power threshold to only transmit the non-delay tolerant data packets, and if the amount of power available is above the power threshold to transmit the non-delay tolerant data packets and the delay tolerant data packets.

4. The communications terminal as claimed in claim 1, wherein the current state of radio communications is determined by the controller from signals received by the receiver from data transmitted by the mobile communications network, the receiver providing to the controller a channel quality measurement indicator, and the predetermined conditions include whether the channel quality measurement indicator indicates a quality for radio communications above a first predetermined level, and if the channel quality measurement for radio communications is above the first predetermined threshold the controller is configured to transmit the delay tolerant data packets and non-delay tolerant data packets when present in the input buffer.

5. The communications terminal as claimed in claim 4, wherein the predetermined conditions include whether the channel quality measurement indicator indicates a quality for radio communications below the first predetermined threshold and above a second predetermined level, and if the channel quality measurement for radio communications is above the second predetermined threshold and below the first predetermined threshold the controller is configured to transmit the delay tolerant data packets if the number of delay tolerant data packets in the input buffer has reached a predetermined amount, and to transmit the delay tolerant data packets from the input buffer with non-delay tolerant data packets, when there is at least one non-delay tolerant data packet present in the input buffer.

6. The communications terminal as claimed in claim 4, wherein the predetermined conditions include whether the channel quality measurement indicator indicates a quality for radio communications below the first predetermined threshold, below the second predetermined threshold and above a third predetermined level, and if the channel quality measurement for radio communications is above the third predetermined threshold and below the first and second predetermined thresholds the controller is configured to transmit the non-delay tolerant data packets and to maintain the non-delay tolerant data packets in the input buffer until the channel quality measurement indicator indicates a quality above the first or second predetermined threshold.

7. The communications terminal as claimed in claim 1, wherein the current state for radio communications includes whether the communications terminal has detached from a first infrastructure equipment of the mobile communications network and re-attached to a second infrastructure equipment in accordance with a hand-over procedure, and if the communications terminal has performed a handover procedure, the controller is configured to transmit any delay tolerant and non-delay tolerant data packets from the input buffer to the mobile communications network.

8. A method of communicating data from a communications terminal to a wireless communications network, the method comprising:
  transmitting, with a transmitter, signals to the wireless communications network via a wireless access interface provided by the wireless communications network,
  receiving, with a receiver, signals from the wireless communications network, and
  controlling, with a controller, the transmitting and the receiving of the signals, wherein the controlling includes
  receiving data packets for transmission by the communications terminal via the wireless access interface,
  storing the data packets in an input buffer,
  identifying whether the received data packets are delay tolerant or non-delay tolerant,
  determining in combination with the received signals an indication of a current state for radio communications formed by the wireless access interface for transmitting the data packets via the wireless access interface, and
  in accordance with predetermined conditions which include a current state for radio communications and an amount of the delay tolerant data packets in an input buffer and an amount of the non-delay tolerant packets in the input buffer determining whether to one of:
  transmit the non-delay tolerant data packets to the wireless communications network using the transmitter,
  aggregate the non-delay tolerant data packets and the delay tolerant data packets together and transmit the aggregated on-delay tolerant data packets and the delay tolerant data packets to the wireless communications network using the transmitter, and
  maintain both the delay tolerant data packets and the non-delay tolerant data packets in the input buffer until the predetermined conditions are satisfied.

9. The method of communicating as claimed in claim 8, comprising:
  monitoring an amount of power which is available to transmit or to receive the data via the wireless access interface, wherein the predetermined conditions for determining whether to transmit the non-delay tolerant data packets or to transmit the non-delay tolerant data packets and the delay tolerant data packets from the input buffer to the mobile communications network includes the amount of power available to the transmitter to transmit the data packets in combination with the current state for radio communications.

10. The method of communicating as claimed in claim 9, wherein the predetermined conditions for determining whether to transmit the non-delay tolerant data packets or to transmit the non-delay tolerant data packets and the delay tolerant data packets from the input buffer to the mobile communications network includes whether the amount of power available is above or below a power threshold and if the amount of power available is below the power threshold only transmitting the non-delay tolerant data packets, and if the amount of power available is above the power threshold transmitting the non-delay tolerant data packets and the delay tolerant data packets.

11. The method of communicating as claimed in claim 8, comprising:
  determining the current state of radio communications from the signals received from the mobile communications network,
  providing to the controller a channel quality measurement indicator, and the predetermined conditions for determining whether to transmit the non-delay tolerant data packets or to transmit the non-delay tolerant data packets and the delay tolerant data packets from the input buffer to the mobile communications network include whether the channel quality measurement indicator indicates a quality for radio communications above a first predetermined level, and
  if the channel quality measurement for radio communications is above the first predetermined threshold, transmitting the delay tolerant data packets or non-delay tolerant data packets when present in the input buffer.

12. The method of communicating as claimed in claim 11, wherein the predetermined conditions include whether the channel quality measurement indicator indicates a quality for radio communications below the first predetermined threshold and above a second predetermined level, and
  if the channel quality measurement for radio communications is above the second predetermined threshold and below the first predetermined threshold the method further comprises:
  transmitting the delay tolerant data packets if the number of delay tolerant data packets in the input buffer has reached a predetermined amount, and to transmit the delay tolerant data packets from the input buffer with and non-delay tolerant data packets, when there is at least one non-delay tolerant data packet present in the input buffer.

13. The method of communicating as claimed in claim 11, wherein the predetermined conditions include whether the channel quality measurement indicator indicates a quality for radio communications below the first predetermined threshold, below the second predetermined threshold and above a third predetermined level, and if the channel quality measurement for radio communications is above the third predetermined threshold and below the first and second predetermined thresholds, the method further comprises transmitting the non-delay tolerant data packets and to maintain the delay tolerant data packets in the input buffer until the channel quality measurement indicator indicates a quality above the first or second predetermined threshold.

14. The method of communicating as claimed in claim 8, wherein the current state for radio communications includes whether the communications terminal has detached from a first infrastructure equipment of the mobile communications network and re-attached to a second infrastructure equipment in accordance with a hand-over procedure, and if the communications terminal has performed a handover procedure, the method further comprises transmitting any delay tolerant and non-delay tolerant data packets from the input buffer to the mobile communications network.

15. A non-transitory computer-readable medium encoded with computer-readable instructions that, when executed by a processor, cause the processor to perform the method according to claim 8.

* * * * *